United States Patent
Hutton et al.

(10) Patent No.: US 6,421,487 B1
(45) Date of Patent: Jul. 16, 2002

(54) REINFORCED BUFFERED FIBER OPTIC RIBBON CABLE

(75) Inventors: Curtis John Hutton, Hickory; Justin Albert Thompson, Huntersville, both of NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/562,960

(22) Filed: May 3, 2000

(51) Int. Cl.[7] .................................................. G02B 6/44
(52) U.S. Cl. ....................................................... 385/114
(58) Field of Search ................................. 385/103, 100, 385/106, 113, 114, 115, 127, 147, 141; 57/293; 350/96.23, 96.29

(56) References Cited

U.S. PATENT DOCUMENTS

| | | | |
|---|---|---|---|
| 4,514,037 A | * 4/1985 | Bishop et al. | 350/96.23 |
| 4,534,618 A | * 8/1985 | Bruggendieck | 350/96.23 |
| 4,715,677 A | 12/1987 | Saito et al. | |
| 4,812,014 A | * 3/1989 | Sawano et al. | 350/96.29 |
| 5,062,685 A | 11/1991 | Cain et al. | |
| 5,253,318 A | * 10/1993 | Sayegh | 385/114 |
| 5,524,164 A | 6/1996 | Hattori et al. | |
| 5,636,307 A | 6/1997 | Cowen et al. | |
| 5,673,352 A | 9/1997 | Bauer et al. | |
| 5,675,686 A | 10/1997 | Rosenmayer et al. | |
| 5,761,363 A | 6/1998 | Mills | |
| 5,802,231 A | 9/1998 | Nagano et al. | |
| 5,905,835 A | 5/1999 | Bourghelle et al. | |
| 6,167,178 A | * 12/2000 | Nave | 385/103 |
| 6,210,802 B1 | * 4/2001 | Risch | 428/398 |
| 6,259,844 B1 | * 7/2001 | Logan et al. | 385/113 |
| 6,293,081 B1 | * 9/2001 | Grulick et al. | 57/293 |

* cited by examiner

*Primary Examiner*—Neil Abrams
*Assistant Examiner*—J. F. Duverne
(74) *Attorney, Agent, or Firm*—Sughrue Mion, PLLC

(57) ABSTRACT

A buffered optical fiber ribbon cable includes at least one optical fiber ribbon cable, which has parallel optical fibers encased in a ribbon matrix sheath, and a ribbon buffering layer surrounding the optical fiber ribbon cable. The ribbon matrix sheath is at least partially molecularly bonded to outer coatings of the optical fibers and surrounds the parallel optical fibers, thereby holding the optical fibers immediately adjacent one another. The material of the ribbon buffering layer is preferably UV curable resin or thermoplastic material. Also, the ribbon buffering layer material may further contain imbedded reinforcement fibers for strengthening the ribbon buffering layer. The ribbon buffering layer is made of a material that allows the buffered optical fiber ribbon cable to be installed in environments independent of any additional protective cable covering. Moreover, the buffered optical fiber ribbon cable may have an optional outer buffering layer, surrounding the ribbon buffering layer, for added protection from the environment (e.g., fire retardant properties).

25 Claims, 7 Drawing Sheets

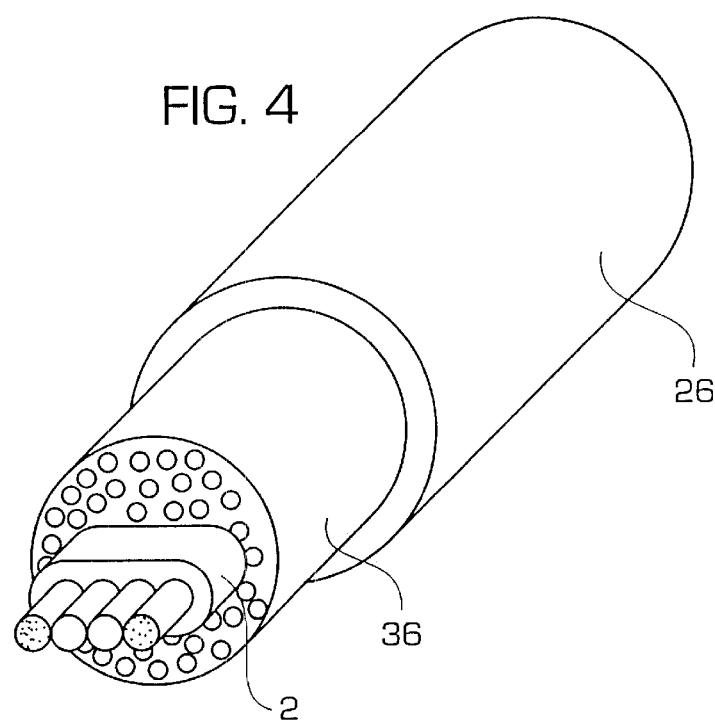
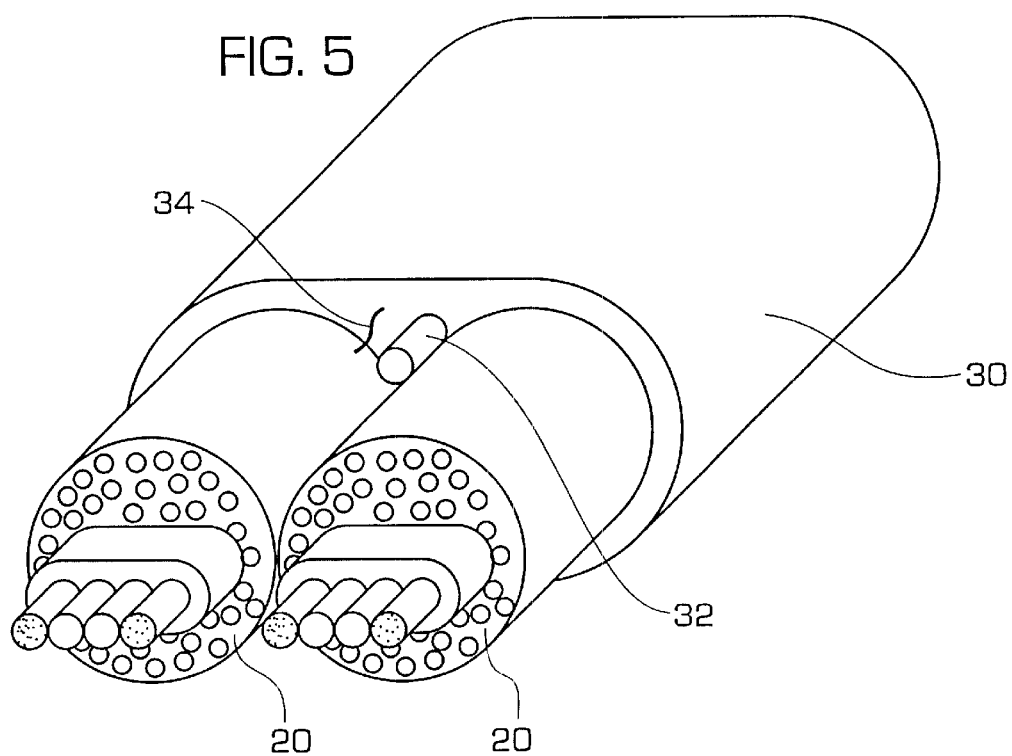

REINFORCED BUFFERED FIBER OPTIC RIBBON CABLE

BACKGROUND OF THE INVENTION

1. Field of the Present Invention

This invention relates generally to a buffered fiber optic ribbon cable. In particular, the invention is directed to a fiber optic ribbon cable with a buffering layer to protect the fiber optic ribbon cable from the environment in which the fiber optic ribbon cable is installed.

2. Description of the Related Art

Installations of optical fiber as data transmission media for applications such as digital communications require increasingly diversified configurations of optical fiber cables. One such configuration of optical fiber cables is the optical fiber ribbon. An optical fiber ribbon is a type of flat cable that is simple to joint or "connectorize" with, e.g., other optical fiber ribbons because mass jointing is easier than jointing independent cables. Further, because optical fiber ribbons reduce the need for manipulating individual optical fibers, optical fiber maintenance procedures are simplified.

Another benefit of optical fiber ribbons is the higher optical fiber density in the connecting plane. That is, more optical fibers can be connected along the plane of the optical fiber ribbon than can be connected using individual optical fibers. This is due to the tight formation of the optical fibers held in the ribbon matrix of the optical fiber ribbon.

Optical fiber ribbons typically consist of two or more parallel optical fibers held together by a ribbon matrix. The optical fibers are embedded in the ribbon matrix, which is typically a non-porous, insulative sheath made of ultraviolet (UV) curable resin or electron beam (EB) curable resin or the like. Each of the optical fibers embedded in the ribbon matrix generally comprises a coated glass core and cladding, etc.

FIG. 9 depicts a conventional optical fiber ribbon 2 in which a number (e.g., eight) of parallel optical fibers 4 are embedded in a ribbon matrix 6. A standard 8-fiber ribbon is shown, but this description applies to all ribbons of various fiber counts. Each of the optical fibers, which are held in place by the ribbon matrix, generally comprises a glass core 8, cladding 10, and outer coating 12 (which may comprise multiple coating layers). The ribbon matrix 6 surrounding the optical fibers 4 is typically made of a non-porous UV curable resin or the like which, when cured, partially molecularly bonds with the outer coating 12.

FIG. 10 shows a typical conventional installation situation in which several conventional optical fiber ribbons 2 are stacked on top one another and housed in a cable covering 14. The cable covering 14 is then filled with a filling gel 16 which further supports the optical fiber ribbons 2 stacked within the cable covering 14. Together, the conventional optical fiber ribbons 2, the cable covering 14 and the filling gel 16 comprise a fiber optic cable 18. The cable covering 14 provides protection from the environmental conditions of the surroundings in which the fiber optic cable 18 is installed.

The ribbon matrix of presently available optical fiber ribbons is not designed to protect the optical fibers it contains from harsh environmental conditions of the installation site. Rather, the typical UV curable ribbon matrix is partially molecularly bonded with the outer coating of the two or more parallel optical fibers in order to merely hold the optical fibers immediately adjacent to each other in a substantially planar ribbon-like manner. Since the ribbon matrix does not afford great protection for the optical fibers, the fiber optic ribbons are typically installed within a cable (i.e., housing or covering) which protects the fiber optic ribbons from various installation environment conditions. Often, a single outer protective cable will include numerous optical fiber ribbons, stacked one on another or otherwise disposed in the cable, and a filling gel or the like surrounding the numerous optical fiber ribbons within the cable. The installation of individual fiber optic ribbons without outer protective cable is neither known nor recommended.

It is known conventionally to provide a fiber optic microcable comprising a single optical waveguide encased in a buffer, which is then coated with a fiber reinforced protective sheath formed of UV light-cured resin (see, e.g., U.S. Pat. No. 5,636,307). This protective sheath consists of an UV light curable resin impregnated with fibers to enhance the physical strength characteristics of the microcable. Because the resin polymerizes almost instantaneously, there is no tendency for the resin to sag out of round as there is for microcable cured in a long oven. Therefore, the resulting microcable is uniformly round over its entire length. However, the microcable of '307 is an individual optical fiber and therefore suffers from the same disadvantages when it comes to installation and jointing or "connectorization" (i.e., density in the connecting plane and the need to manipulate individual optical fibers), as compared to fiber optic ribbons.

It is also conventionally known to provide an optical fiber multi-ribbon comprising at least two individual initial optical fiber ribbons that are positioned side-by-side in a common plane and surrounded by a common exterior sheath (see, e.g., U.S. Pat. No. 5,905,835). Each of the individual initial optical fiber ribbons comprises an individual sheath for assembling the optical fibers of each ribbon together side-by-side and in a common plane. The individual sheaths of the individual initial optical fiber ribbons and the common exterior sheath are made from the same resin. However, the optical fiber multi-ribbon disclosed of '835 is designed to be used in a high-density optical cable, wherein the optical fiber multi-ribbon is housed within an outer protective housing (the cable), which provides protection from the installation environment. In other words, the common exterior sheath disclosed in '835 is not suitable for installation without an additional protective cable covering. Moreover, the common exterior sheath of the optical fiber multi-ribbon of '835 merely bonds the individual initial optical fiber ribbons together. The common exterior sheath does not function to protect each individual initial optical fiber ribbon in the event the individual initial optical fiber ribbons are split apart. Furthermore, the optical fiber multi-ribbon of '835 contains no strengthening members.

It is also conventionally known to provide a porous buffer material for optical transmission media, wherein the porous buffer material directly surrounds the light transmitting fiber core (see, e.g., U.S. Pat. No. 5,675,686). The disclosed porous buffer material is a closed-cell porous polymer material which have more mechanical compliance compared to full density polymers because they contain a significant amount of void space. The essential purpose of a porous buffer material that directly surrounds the light transmitting fiber core is to widely distribute mechanical loads in both a temporal and spacial sense. This is because glass fibers are susceptible to fracture when subjected to closely distributed temporal loads, i.e. impact loads.

The porous polymers of '686 offer improved temporal load distribution by having a lower amount of material in the loaded area. Since there is less material available to absorb the load, the effective unit loading is higher. This higher loading means that the material undergoes more plastic (versus elastic) deformation. The plastic (versus elastic) deformation, caused by less material available to absorb the load, prevents the load from being rapidly transferred to the fiber. The spacial load distribution is accomplished in a similar manner. Because there is less material in the area of the load, the load must be distributed over a wider area. Therefore, the porous buffering material of '686 provides a special type of protection to optical fiber systems different from the standard ribbon matrix, which is a non-porous, insulative sheath made of UV curable resin or the like.

Finally, notwithstanding the benefits of using optical fiber ribbons over individual optical fibers, several disadvantages are associated with the presently available optical fiber ribbons. The drawbacks of using the presently available optical fiber ribbons housed within the outer protective cable include, among other things, a typically large increase in size of the installed cable (at least because of the wasted space between the optical fiber ribbons and the outer protective cable), and the additional manufacturing or installation step of covering the optical fiber ribbons with the outer protective cable.

SUMMARY OF THE PRESENT INVENTION

It is an object of the present invention to overcome the above-mentioned drawbacks, whereby an individual optical fiber ribbon can be installed without being housed in an outer protective cable, thereby reducing the overall diameter of the installed cable and increasing the available installation adaptability of the cable to be installed.

The above and other objects are achieved by a first aspect of the present invention in which a buffered optical fiber ribbon cable includes at least one optical fiber ribbon cable, comprising a plurality of parallel optical fibers encased in a ribbon matrix sheath, and a buffering layer surrounding the optical fiber ribbon cable. The ribbon matrix sheath is at least partially molecularly bonded to outer coatings of the optical fibers and surrounds the plurality of parallel optical fibers, thereby holding the plurality of optical fibers immediately adjacent one another. The ribbon buffering layer comprises a material that allows the buffered optical fiber ribbon cable to be installed in environments independent of any additional protective cable covering.

Further, the material of the ribbon buffering layer is preferably UV curable resin or thermoplastic material. Also, the ribbon buffering layer material may further contain imbedded reinforcement fibers for strengthening the buffering layer. Moreover, the buffered optical fiber ribbon cable may have an optional outer buffering layer, surrounding the ribbon buffering layer, for added protection from the environment (e.g., fire retardant properties).

Another aspect of the present invention relates to a buffered optical fiber ribbon cable as described above, however, the buffered optical fiber ribbon cable includes a plurality of individually buffered optical fiber ribbon cables surrounded by an outer packaging buffer. The outer packaging buffer may have ripcords for separating the outer packaging buffer in order to access and split apart the individually buffered optical fiber ribbon cables. The individually buffered optical fiber ribbon cables can then be installed and used independent from each other, because each has the ribbon buffering layer comprising a material that allows the individually buffered optical fiber ribbon cable to be installed in environments independent of any additional protective cable covering.

The embodiments hereinafter described allow the fiber optic ribbon cable to be installed independent of any additional protective cable covering, and allow the fiber optic ribbon cable to be installed as independent cables where considerably smaller cable size is optimal.

These and other features and advantages of the present invention will be evident from the following description of the preferred and other embodiments shown in the accompanying figures.

BRIEF DESCRIPTION OF THE DRAWINGS

FIG. 4 depicts another aspect of the present invention in which the ribbon buffering layer is round in cross section;

FIG. 5 depicts another multi-ribbon aspect of the present invention;

DETAILED DESCRIPTION OF THE INVENTION

Figure 1A:
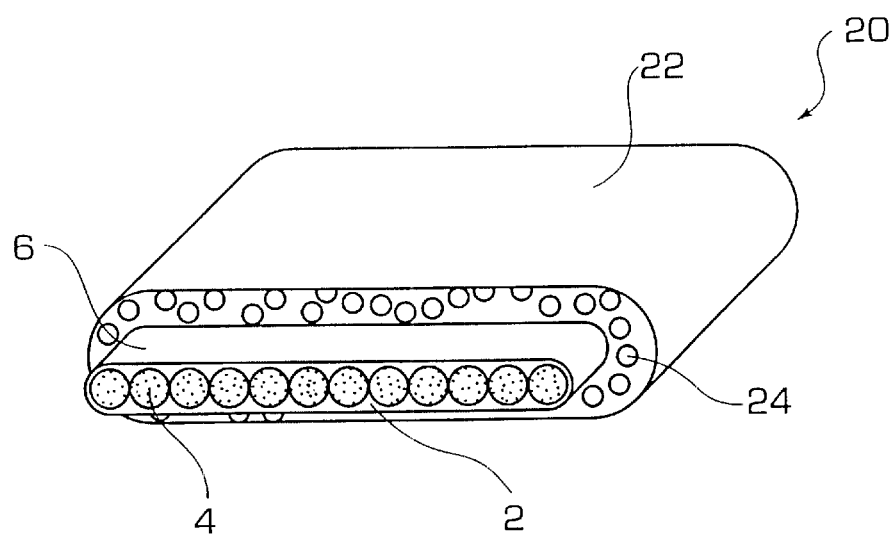
FIG. 1A depicts a first aspect of the buffered fiber optic ribbon cable of the present invention.

Throughout the drawings and description of the present invention, like reference numerals will be used to designate like elements. Furthermore, while certain optical fiber ribbon examples are shown, it will be appreciated that the concepts of the present invention are applicable to many other sizes, shapes and structures, etc., of optical fiber ribbons presently available in the industry or designed in the future.

Figure 9:
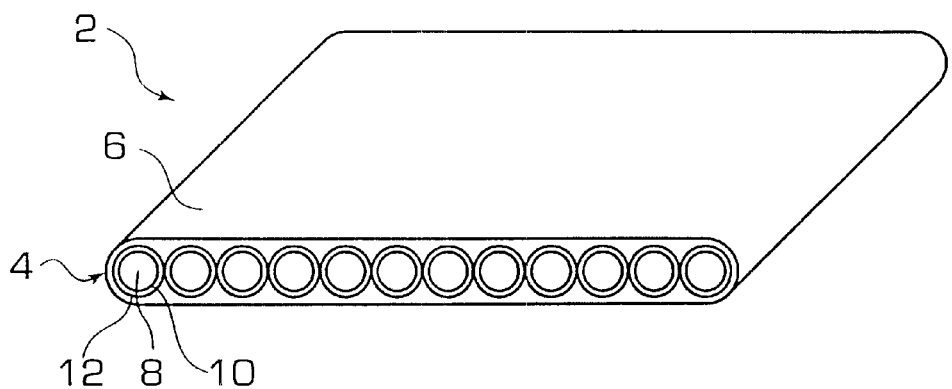
FIG. 9 depicts a conventional optical fiber ribbon.
Figure 10:
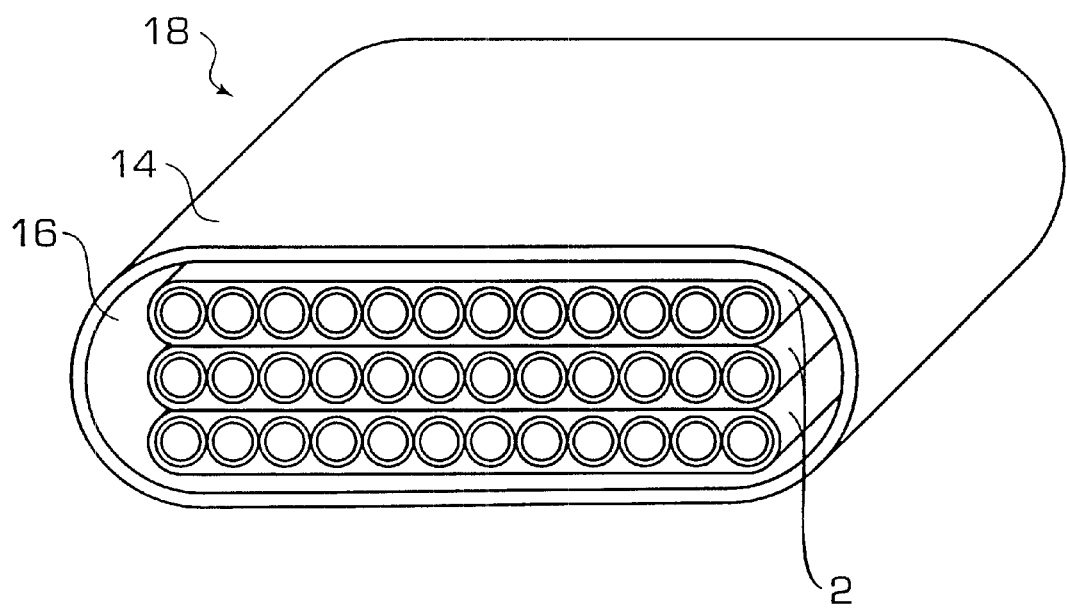
FIG. 10 depicts a conventional installed fiber optic cable containing optical fiber ribbons which are housed in conventional installation cable covering.

Turning now to the present invention, FIG. 1A depicts an embodiment of the present invention in which a buffered fiber optic ribbon cable 20 comprises a conventional optical fiber ribbon 2, such as described above in relation to FIG. 9, (including optical fibers 4 embedded in ribbon matrix 6), which is encased in a ribbon buffering layer 22. The ribbon buffering layer 22 may be comprised of, e.g., UV curable resin or thermoplastic. Optionally, the ribbon buffering layer 22 may contain embedded strength reinforcement fibers (or filaments) 24. The embedded strength reinforcement fibers 24 may be comprised of, e.g., fiberglass, aramid, or any other strengthening fibers. The ribbon buffering layer 22 protects the optical fiber ribbon 2 from the environment in which the buffered fiber optic ribbon cable 20 is installed, allowing the buffered fiber optic ribbon cable 20 to be installed independent of any additional protective cable covering.

Figure 1B:
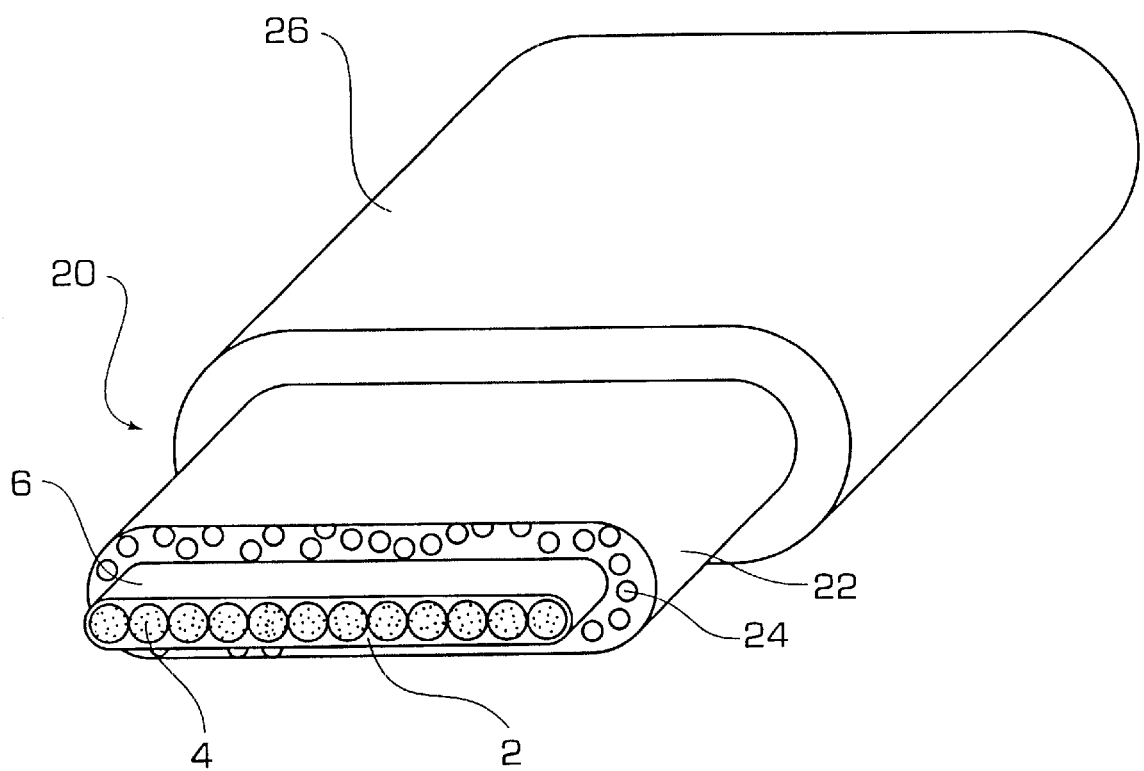
FIG. 1B depicts the first aspect of the buffered fiber optic ribbon cable of the present invention with an optional secondary buffering layer.

FIG. 1B shows the buffered fiber optic ribbon cable 20 including an optional secondary buffering layer 26 which provides additional protection against environmental conditions. This secondary buffering layer 26 may optionally contain the embedded strength reinforcement fibers 24. Either or both the secondary buffering layer 26 and the ribbon buffering layer 22 may be designed to withstand harsh environmental conditions such as fire, water, and various mechanical stresses.

Figure 2:
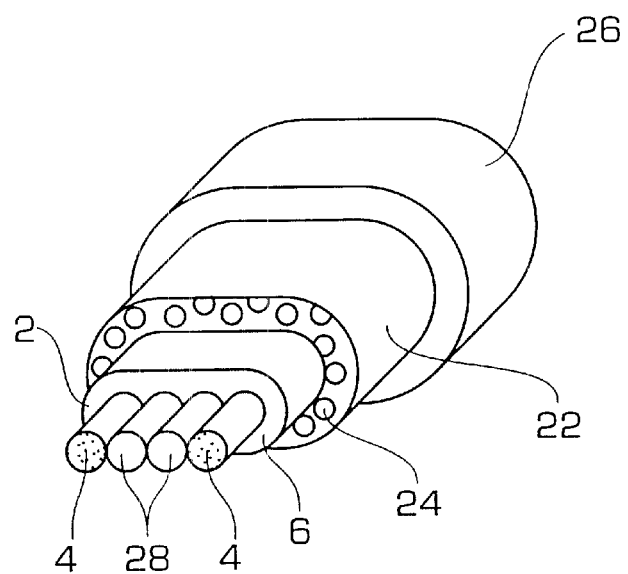
FIG. 2 depicts another aspect of the present invention in which the optical fiber ribbon has both optical fibers and spacer elements encased by the ribbon matrix.

FIG. 2 depicts another aspect of the present invention in which the optical fiber ribbon 2 comprises two parallel optical fibers 4 embedded in the ribbon matrix 6. The optical fiber ribbon 2 further comprises two spacer elements 28 in parallel with the optical fibers 4. The spacer elements 28 serve to space apart the optical fibers 4 and strengthen the optical fiber ribbon 2. A 2-fiber ribbon is shown, but this description applies to all ribbons of various fiber counts. Optionally, the spacer elements 28 may be replaced by optical fibers 4, creating a 4-fiber ribbon without any spacer elements 28.

Figure 3:
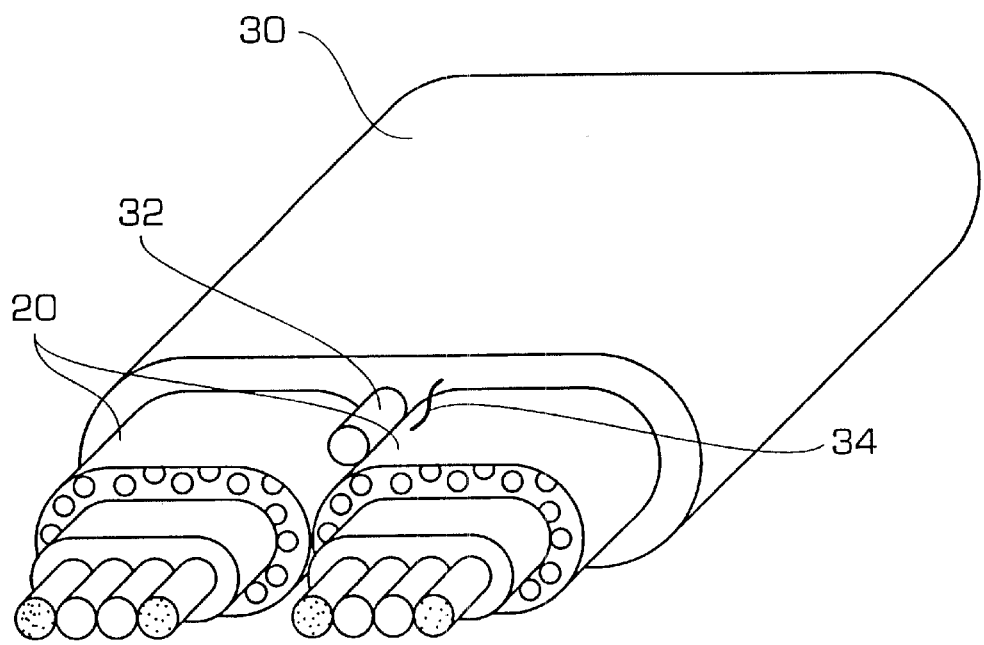
FIG. 3 depicts a multi-ribbon aspect of the present invention.

FIG. 3 shows a multi-ribbon arrangement of the present invention. As shown, two individually buffered fiber optic ribbon cables 20 are encased in an outer packaging buffer layer 30. More than two buffered fiber optic ribbon cables 20 can be embedded by the outer packaging buffer layer 30, depending on the needs of the optical fiber application. The outer packaging buffer layer 30 optionally includes one or more of the following: embedded strength reinforcement fibers 24, a strength reinforcement rods 32 (such as metal or glass reinforced plastic implanted strength rods), and a ripcord 34 for pulling away the outer packaging buffer layer 30 to access the individually buffered fiber optic ribbon cables 20 inside. The individually buffered fiber optic ribbon cables 20 are capable of being used independent of the other and the outer packaging buffer layer 30, because each individually buffered fiber optic ribbon cable 20 has its own ribbon buffering layer 22 with optional embedded strength reinforcement fibers 24. Furthermore, either or both the outer packaging buffer layer 30 and the ribbon buffering layer 22 may be designed to withstand harsh environmental conditions such as fire, water, and various mechanical stresses.

FIG. 4 depicts another aspect of the present invention in which a ribbon buffering layer 36 has a circular cross section, even though the optical fiber ribbon 2 has an oblong cross section (due two the plurality of parallel optical fibers 4 and optional spacer elements 28 held immediately adjacent one another by the ribbon matrix 6). One advantage of a circular cross section ribbon buffering layer 36 is that it fits through grommets, and cable dies in manufacturing equipment. Also, the circular cross section of the ribbon buffering layer 36 allows the buffered fiber optic ribbon cable 20 to be self-aligning with respect to, e.g., other buffered fiber optic ribbon cables.

FIG. 5 shows another multi-ribbon arrangement of the present invention (similar to FIG. 3), except that the individually buffered fiber optic ribbon cables 20 have a circular cross section because of the circular ribbon buffering layers 36. As noted above, more than two buffered fiber optic ribbon cables 20 can be embedded by the outer packaging buffer layer 30, depending on the needs of the optical fiber application. Similar to the structure depicted in FIG. 3, the outer packaging buffer layer 30 optionally includes one or more of the following: embedded strength reinforcement fibers 24, a strength reinforcement rods 32 (such as metal or glass reinforced plastic implanted strength rods), and a ripcord 34 for pulling away the outer packaging buffer layer 30 to access the individually buffered fiber optic ribbon cables 20 inside.

Figure 6:
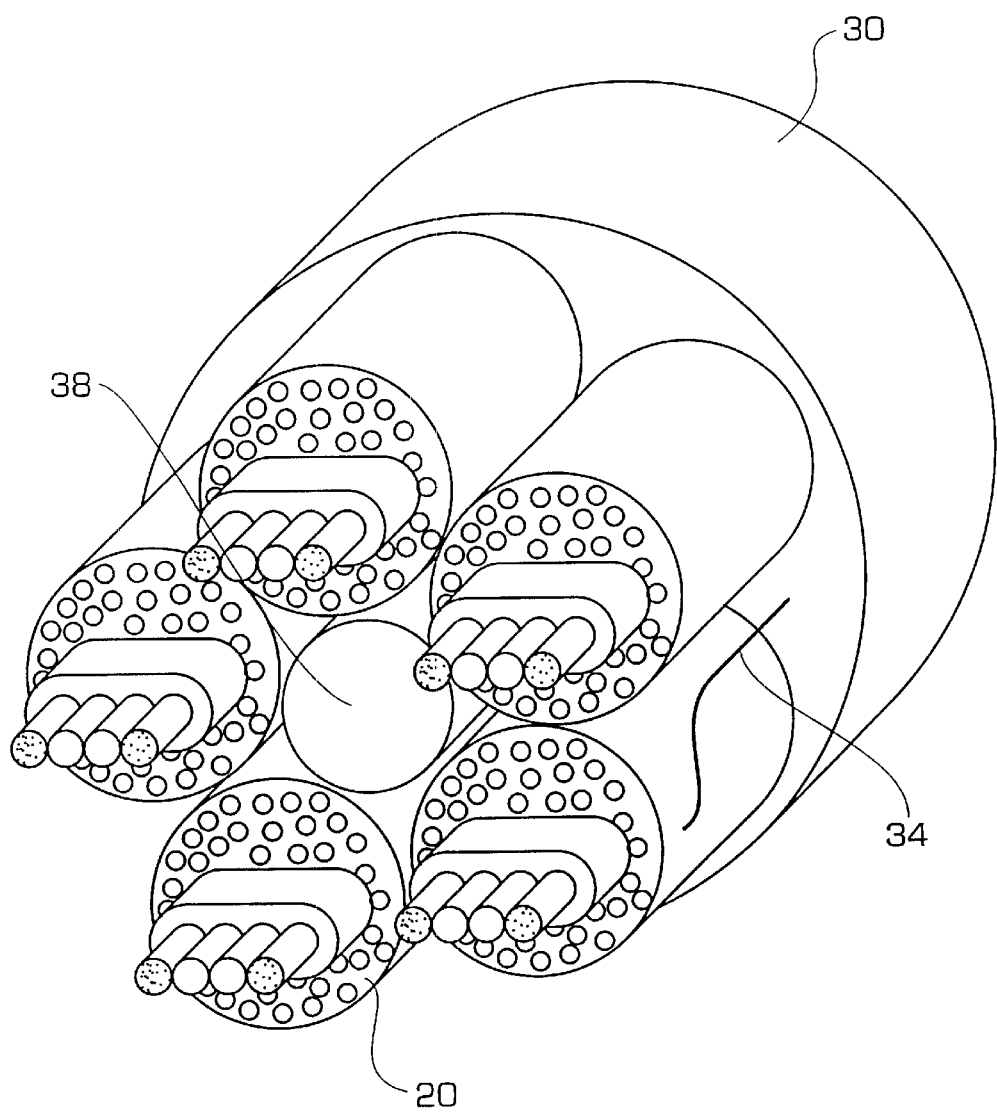
FIG. 6 depicts another multi-ribbon aspect of the present invention, in which multiple round individually buffered fiber optic ribbon cables surround a central strength member.

FIG. 6 shows an example of another multi-ribbon arrangement of the present invention having a higher individually buffered fiber optic ribbon cable count. As shown, five individually buffered fiber optic ribbon cables 20 surround a central strength member 38, wherein the central strength member 38 is made of e.g., steel or glass reinforced plastic. The individually buffered fiber optic ribbon cables 20 may lay linearly parallel to each other and the central strength member 38, or may be helically wound around or S-Z stranded about the central strength member 38. The individually buffered fiber optic ribbon cables 20 and the central strength member 38 are encased in the outer packaging buffer layer 30. Similar to the structure depicted in FIGS. 3 and 5, the outer packaging buffer layer 30 optionally includes one or more of the following: embedded strength reinforcement fibers 24 and a ripcord 34 for pulling away the outer packaging buffer layer 30 to access the individually buffered fiber optic ribbon cables 20 inside.

Figure 7:
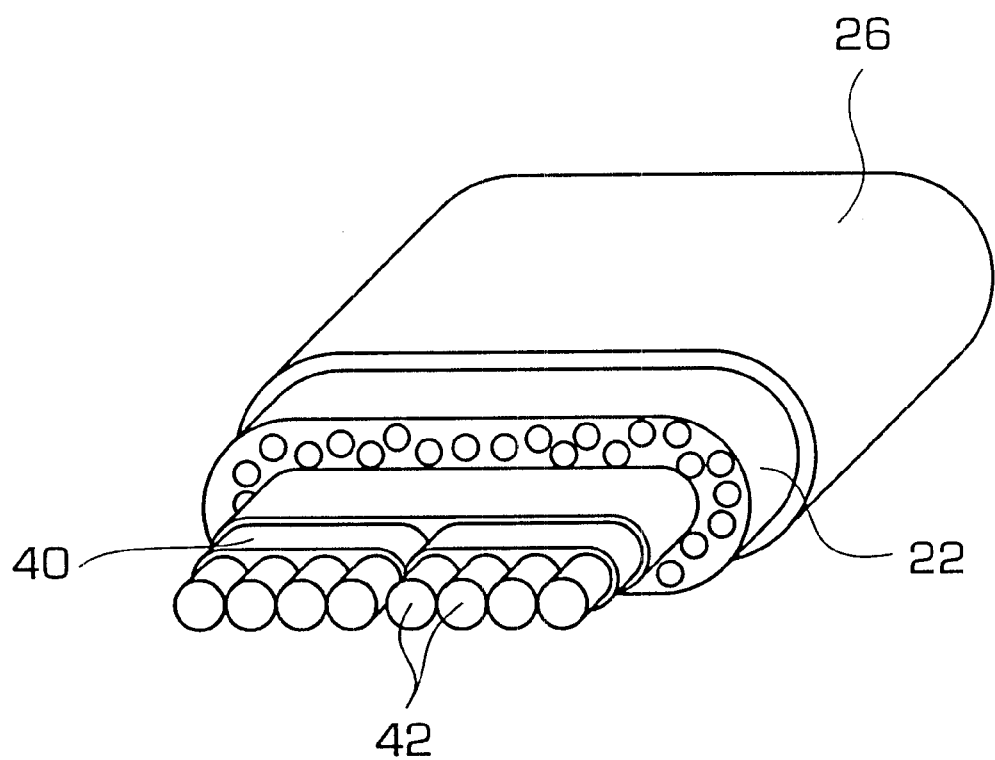
FIG. 7 depicts a splittable ribbon aspect of the present invention.

FIG. 7 shows a splittable ribbon arrangement of the present invention. As shown, a splittable 8-fiber ribbon package 40 containing two individual 4-fiber ribbon units 42 is surrounded by the ribbon buffering layer 22. This arrangement is not limited to the example shown in FIG. 7, but is applicable to any other splittable ribbon configuration. While this aspect does not provide as much protection to the individual 4-fiber ribbon units 42 if the 4-fiber ribbon units 42 are split apart, this aspect does provide protection from the environment in which the buffered fiber optic ribbon cable 20 is installed, allowing the buffered fiber optic ribbon cable 20 to be installed independent of any additional protective cable covering.

Figure 8A:
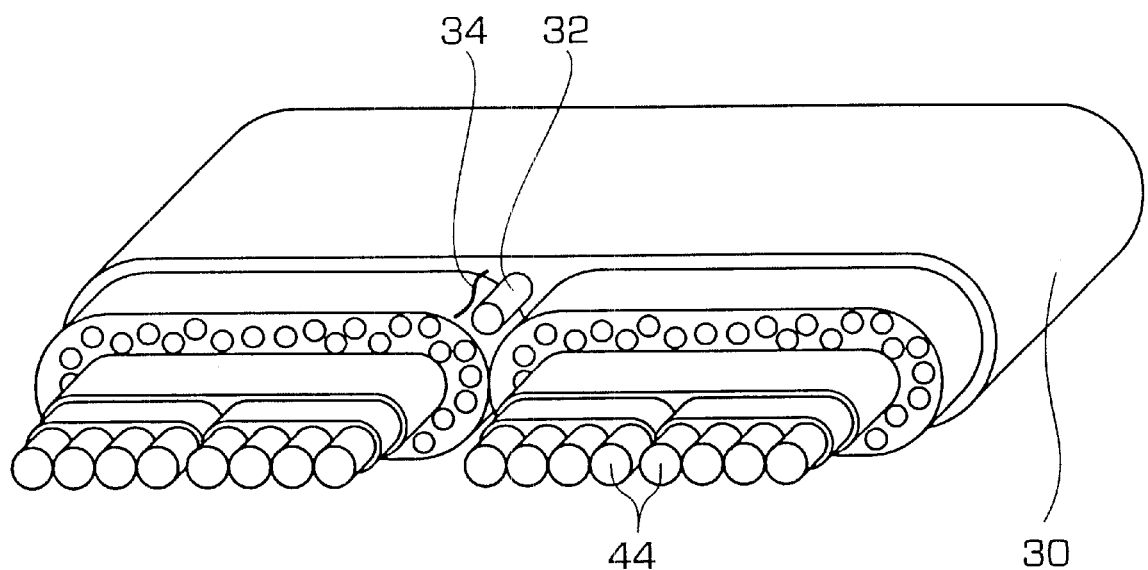
FIG. 8 depicts another splittable ribbon aspect of the present invention.
Figure 8B:
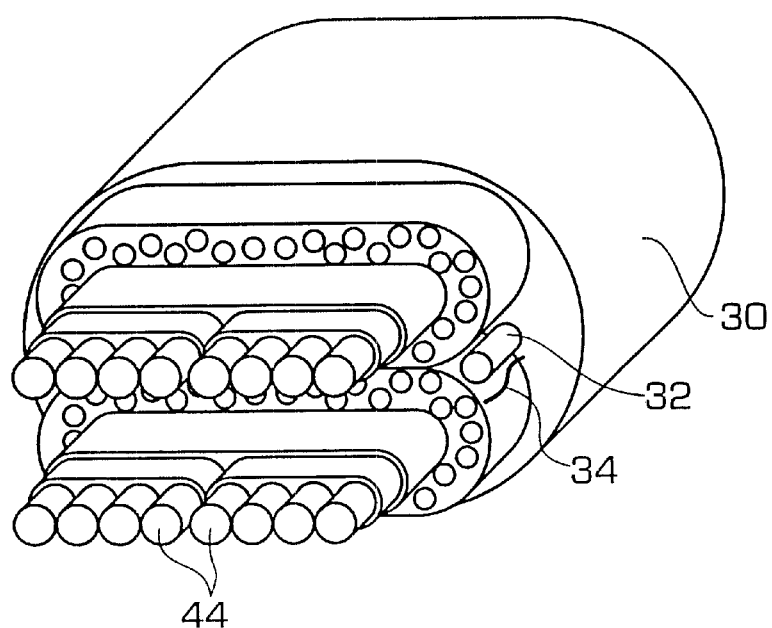

FIG. 8 depicts another splittable ribbon arrangement of the present invention, in which multiple individually buffered splittable ribbon cables 44 are encased in the outer packaging buffer layer 30. More than two individually buffered splittable ribbon cables 44 can be embedded by the outer packaging buffer layer 30, depending on the needs of the optical fiber application. Similar to the structure depicted in FIGS. 3, 5 and 6, the outer packaging buffer layer 30 optionally includes one or more of the following: embedded strength reinforcement fibers 24, a strength reinforcement rods 32 (such as metal or glass reinforced plastic implanted strength rods), and a ripcord 34 for pulling away the outer packaging buffer layer 30 to access the individually buffered splittable ribbon cables 44 inside.

As can be seen from the foregoing, the buffered fiber optic ribbon cable of the present invention overcomes the drawbacks of conventional fiber optic ribbon cables because the buffered optical fiber ribbon of the present invention can be individually installed without being housed in an outer protective cable, thereby reducing the overall diameter of the installed cable and increasing the available installation adaptability of the cable to be installed. The aspects of the present invention described above allow the fiber optic ribbon cable to be installed independent of any additional protective cable covering, and allow the fiber optic ribbon cable to be installed as independent cables where considerably smaller cable size is optimal.

Further, the buffered fiber optic ribbon cable of the present invention provides a more adaptable and flexible alternative to more expensive cable designs. Namely, the buffered fiber optic ribbon cables of the present invention allow easier site-adjustable changes to the optical fiber network being installed. That is, if the installation requirements change, the fiber optic cables can be easily adjusted by simply adding or removing one or more buffered fiber optic ribbon cables of the present invention.

While the present invention has been described with respect to what is presently considered to be the preferred embodiments, the present invention is not limited to the disclosed embodiments. Rather the present invention covers various modifications and equivalent arrangements included within the spirit and scope of the appended claims. The scope of the appended claims is to be accorded the broadest interpretation so as to encompass all such modifications and equivalent structures and functions.

What is claimed is:

1. A buffered optical fiber ribbon cable comprising:

an optical ribbon including a plurality of optical fibers, having outer coatings, arranged in parallel with and adjacent one another, and a ribbon matrix at least partially molecularly bonded to said outer coatings and encasing said plurality of optical fibers, wherein said ribbon matrix is made of a non-porous material; and a ribbon buffering layer completely encasing said ribbon matrix and contacting said ribbon matrix around an entire periphery thereof;

wherein said ribbon buffering layer comprises a material that allows said buffered optical fiber ribbon cable to be installed in environments independent of any additional protective cable covering.

2. A buffered optical fiber ribbon cable as claimed in claim 1, wherein said ribbon buffering layer is thermoplastic material or UV curable material.

3. A buffered optical fiber ribbon cable as claimed in claim 2, further comprising longitudinally extending reinforcement fibers imbedded in said ribbon buffering layer.

4. A buffered optical fiber ribbon cable as claimed in claim 1, further comprising a secondary buffering layer surrounding said ribbon buffering layer, wherein at least one of said secondary buffering layer and said ribbon buffering layer comprises a material for withstanding harsh environmental conditions.

5. A buffered optical fiber ribbon cable as claimed in claim 4, further comprising longitudinally extending reinforcement fibers imbedded in at least one of said secondary buffering layer and said ribbon buffering layer.

6. A buffered optical fiber ribbon cable as claimed in claim 1, wherein said optical ribbon further comprises:

at least one spacer element having a shape substantially equivalent to one of said plurality of optical fibers and held by said ribbon matrix in the same manner as said plurality of optical fibers, wherein said plurality of optical fibers and said at least one spacer element are positioned immediately adjacent one another, and wherein said at least one spacer element is used for either spacing apart said plurality of optical fibers or adding strength to said optical ribbon, or both.

7. A buffered optical fiber ribbon cable as claimed in claim 1, wherein said ribbon buffering layer has a substantially circular cross section, regardless of a cross sectional shape of said optical ribbon.

8. A buffered optical fiber ribbon cable comprising:

an optical ribbon including a plurality of optical fibers, having outer coatings, longitudinally arranged and substantially parallel with and adjacent one another, in substantially the same plane, and a ribbon matrix immediately encasing said plurality of optical fibers, wherein said ribbon matrix is made of a non-porous UV curable resin; and a ribbon buffering layer completely encasing said ribbon matrix and contacting said ribbon matrix around an entire periphery thereof;

wherein said ribbon buffering layer comprises a material adapted to protect said buffered optical fiber ribbon cable from environmental conditions independent of any additional protective cable covering.

9. A buffered optical fiber ribbon cable as claimed in claim 8, wherein said ribbon buffering layer is thermoplastic material or UV curable material.

10. A buffered optical fiber ribbon cable as claimed in claim 9, further comprising longitudinally extending reinforcement fibers imbedded in said ribbon buffering layer.

11. A buffered optical fiber ribbon cable as claimed in claim 8, further comprising a secondary buffering layer surrounding said ribbon buffering layer, wherein at least one of said secondary buffering layer and said ribbon buffering layer comprises a material for withstanding harsh environmental conditions.

12. A buffered optical fiber ribbon cable as claimed in claim 11, further comprising longitudinally extending reinforcement fibers imbedded in at least one of said secondary buffering layer and said ribbon buffering layer.

13. A buffered optical fiber ribbon cable as claimed in claim 8, wherein said optical ribbon further comprises:

at least one spacer element having a shape substantially equivalent to one of said plurality of optical fibers and held by said ribbon matrix in the same manner as said plurality of optical fibers, wherein said plurality of optical fibers and said at least one spacer element are positioned immediately adjacent one another, and wherein said at least one spacer element is used for either spacing apart said plurality of optical fibers or adding strength to said optical ribbon, or both.

14. A buffered optical fiber ribbon cable as claimed in claim 8, wherein said ribbon buffering layer has a substantially circular cross section, regardless of a cross sectional shape of said optical ribbon.

15. A buffered optical fiber ribbon cable comprising:

a plurality of optical ribbons, wherein each of said plurality of optical ribbons comprises:

a plurality of optical fibers, having outer coatings, longitudinally arranged and substantially parallel with and adjacent one another, in substantially the same plane, and a ribbon matrix immediately encasing said plurality of optical fibers, wherein said ribbon matrix is made of a non-porous material; and a plurality of ribbon buffering layers, wherein one of said plurality of ribbon buffering layers completely encases and contacts an entire periphery of each said ribbon matrix of each of said plurality of optical ribbons, thereby forming a plurality of individually buffered ribbon cables; and an outer packaging buffer surrounding said plurality of individually buffered ribbon cables;

wherein said ribbon buffering layers comprise a material adapted to protect said individually buffered ribbon cables from environmental conditions independent of any additional protective cable covering, and wherein said outer packaging buffer is splittable in order to separate said plurality of individually buffered ribbon cables from one another.

16. A buffered optical fiber ribbon cable as claimed in claim 15, wherein said ribbon matrix is UV curable resin which partially molecularly bonds to said outer coatings of said plurality of optical fibers.

17. A buffered optical fiber ribbon cable as claimed in claim 15, further comprising at least one longitudinally aligned ripcord for separating said outer packaging buffer in order to access and split apart said plurality of individually buffered ribbon cables.

18. A buffered optical fiber ribbon cable as claimed in claim 15, further comprising a strength reinforcement structure enclosed by said outer packaging buffer, wherein said strength reinforcement structure comprises at least one of embedded reinforcement fibers and a longitudinally arranged reinforcement rod.

19. A buffered optical fiber ribbon cable as claimed in claim 15, further comprising:

a central strength member surrounded by said outer packaging buffer, wherein each of said plurality of individually buffered ribbon cables has a substantially circular cross sectional shape due to said ribbon buffer layers, wherein said plurality of individually buffered ribbon cables surround said central strength member, and wherein said plurality of individually buffered ribbon cables are aligned in parallel with said central strength member, or helically wound around said central strength member, or stranded about said central strength member.

20. A buffered optical fiber ribbon cable as claimed in claim 15, wherein said ribbon buffering layers have substantially circular cross sections, regardless of respective cross sectional shapes of said plurality of optical ribbons.

21. A buffered optical fiber ribbon cable as claimed in claim 15, wherein each of said individually buffered ribbon cables further comprises:

a secondary buffering layer surrounding each of said ribbon buffering layers, wherein at least one of said secondary buffering layer and said each ribbon buffering layer comprises a material for withstanding harsh environmental conditions.

22. A buffered optical fiber ribbon cable as claimed in claim 21, further comprising longitudinally extending reinforcement fibers imbedded in at least one of said secondary buffering layer and said each ribbon buffering layer.

23. A buffered optical fiber ribbon cable as claimed in claim 15, wherein said ribbon buffering layers are thermoplastic material or UV curable material.

24. A buffered optical fiber ribbon cable as claimed in claim 23, further comprising longitudinally extending reinforcement fibers imbedded in said ribbon buffering layers.

25. A buffered optical fiber ribbon cable as claimed in claim 15, wherein each of said plurality of optical ribbons further comprises:

at least one spacer element having a shape substantially equivalent to one of said plurality of optical fibers and held by said ribbon matrix in the same manner as said plurality of optical fibers, wherein said plurality of optical fibers and said at least one spacer element are positioned immediately adjacent one another, and wherein said at least one spacer element is used for either spacing apart said plurality of optical fibers or adding strength to said each optical ribbon, or both.

* * * * *